United States Patent [19]

Dubreuil et al.

[11] Patent Number: 4,514,272
[45] Date of Patent: Apr. 30, 1985

[54] PROCESS AND DEVICE FOR BREAKING STABILIZED EMULSIONS, ESPECIALLY OIL-WATER EMULSIONS

[75] Inventors: Jean-Pierre Dubreuil, Lagor; Jean Blazejczak; Bernard Tramier, both of Billere, all of France

[73] Assignee: Societe Nationale Elf Aquitaine (Production), Courbevoie, France

[21] Appl. No.: 581,800

[22] Filed: Feb. 21, 1984

[30] Foreign Application Priority Data

Feb. 21, 1983 [FR] France .................................. 83 02746

[51] Int. Cl.$^3$ ......................... B01D 17/06; B03C 5/00
[52] U.S. Cl. ................................... 204/186; 204/188; 204/302
[58] Field of Search ...................... 204/186, 188, 302

[56] References Cited

U.S. PATENT DOCUMENTS 3,412,002 11/1968 Hubby .................................. 204/186

Primary Examiner—Thomas Tufariello
Attorney, Agent, or Firm—Brisebois & Kruger

[57] ABSTRACT

Process and device for breaking stabilized emulsions.

Such a device is constituted by a tank divided into two compartments by a permeable membrane constituting a percolating electrode connected to a continuous or pseudo-continuous electric current supply, a first compartment provided with emulsion feed means and a second compartment provided with means for evacuating the effluent.

This device is particularly adapted to the treatment of oil-water emulsions.

17 Claims, 1 Drawing Figure

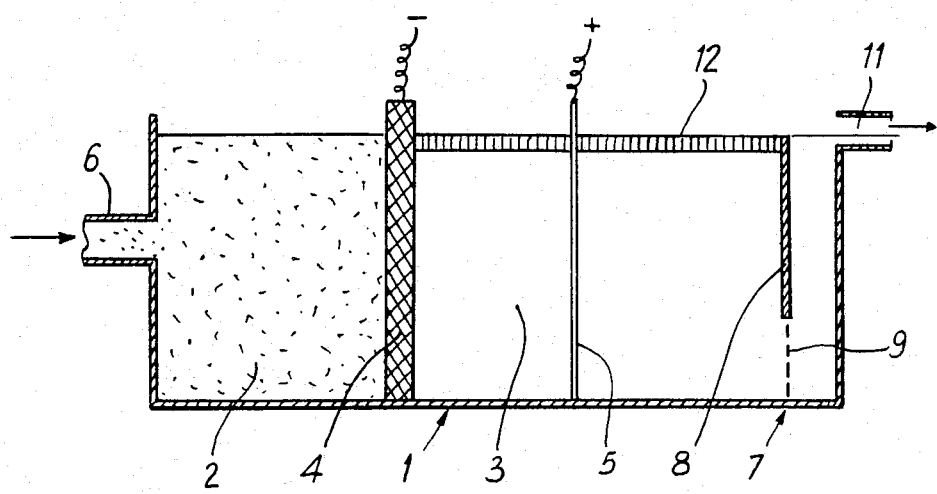

PROCESS AND DEVICE FOR BREAKING STABILIZED EMULSIONS, ESPECIALLY OIL-WATER EMULSIONS

BACKGROUND OF THE INVENTION

1. Field of the Invention

The invention concerns a process for breaking stabilized emulsions, especially oil-water emulsions, and a device for operating this process.

2. Description of the Prior Art

Classic water deoiling processes become inefficient when they are applied to certain types of emulsions that are called stabilized, especially for an oil-in-water emulsion.

Such an emulsion is constituted by a suspension in which the colloidal substance is liquid. The diameter of the oily particles is smaller than $100\mu$ and often even than $60\mu$.

A stable emulsion comprises fine droplets of hydrocarbons in suspension in a liquid, water in general, the viscosity of which is opposed to their agglomeration.

The forming of emulsions is favored by products currently used in Exploration/Production, such as bactericides, corrosion inhibitors, . . . that lower the interfacial tension between liquid-liquid.

The stability of a hydrocarbon emulsion in water is due especially to the equilibrium of the following forces or factors:
 the forces of gravity acting on the micelles;
 the affinity of the micelles for the solvent;
 the forces of electrostatic repulsion;
 the solubility of the hydrocarbon in water, if aromatics, asphaltenes, . . . are present.

The micelles in suspension in water are generally negatively charged. As a result of this, a double electric layer is produced that is established at the oil-water interface.

This double layer is constituted by the charged particles and an equivalent of opposite charge ions accumulated in the water at the surface of the oily particle.

Flottation processes and coalescent filters are both generally ineffectual.

The use of an electric field was proposed by electroflottation means. In this case, the electrodes cover the surface area of the flottation basin. Through electrolysis of water, $H_2$ and $O_2$ microbubbles are formed that carry along the hydrocarbons towards the surface. In certain cases, the corrosion of an aluminium anode liberates $Al_3+$ ions that act as coagulation agent.

These treatments necessitate large installations and water treatment yields hardly reach 50%.

SUMMARY OF THE INVENTION

The present invention overcomes these difficulties by provoking the cancelling out of the electrostatic repulsion forces existing between the oily particles and the water.

In a process according to the invention, to break the stabilized emulsions, a space 2 limited in part by a face of a permeable membrane 4 constituting a percolating electrode to which is applied a direct or pseudo-direct electric current is supplied with emulsion and the effluent is evacuated from a space 3 limited in part by the other face of the permeable membrane 4. Higher yields are obtained when the percolating electrode is a cathode.

In a general manner, when the filtering membrane is made of carbon or graphite fibers, it is treated, prior to its use, through impregnation by using a surfactant or surface active agent to modify its surface state.

In a preferential manner, in the different realizations, a determined difference of pressure between the two spaces separated by the permeable membrane 4 is applied in order to control the emulsion flowrate through this membrane.

A device according to the invention to break the stabilized emulsions in two phases is constituted by a tank 1 divided into two compartments by a permeable membrane 4 constituting a percolating electrode connected to a direct or pseudo-direct electric current supply, a first compartment being connected to emulsion feed means, a second compartment being provided with means for separating the two phases or for evacuation towards such an separator.

In certain realizations, the percolating electrode is made of metallic fibers, for example, expanded titanium.

In other realizations, the percolating electrode is made of carbon or graphite fibers. In this case, prior to its use, in a preferential manner, the percolating electrode is previously treated through impregnation of a surfactant.

The highest yields are obtained when the percolating electrode is a cathode, i.e. when it has a negative polarity.

The best yields are obtained when the surfactant presents a number of HLB comprised between 50 and 20 and preferably between 10 and 16.

According to a preferred embodiment, the surfactant is alkyl-sulfate-based and known in the trade under the name of TEEPOL.

BRIEF DESCRIPTION OF THE DRAWINGS

The drawing shows a schematic section of apparatus according to the invention for breaking stabilised emulsions.

DETAILED DESCRIPTION

The invention will be better understood from reading through the following description, given by way of non-limitative illustration, of the device represented in the annexed FIGURE.

The device is constituted by a tank 1 divided into two compartments, a first compartment 2 or upstream compartment and a second compartment 3 or downstream compartment, by a permeable membrane 4 constituting a percolating electrode connected to a direct or pseudo-direct electric current supply, with a negative polarity or cathode.

In the second compartment 3 is disposed a counter-electrode or anode 5 having the shape of a bar or a plate of limited dimensions and not constituting an obstacle to the circulation of the effluent.

Into the first compartment 2 issues a feed pipe 6 for the emulsion. The second compartment 3 constitutes a decantation basin provided at the end 7, opposite the permeable membrane 4 with a partition 8 bored at its loer part by bore-holes 9 that communicate the compartment 3 with a space provided with an evacuation pipe (11) in high position.

On the surface of the liquid, in the compartment (3), the FIGURE represents a layer (12) of free hydrocarbons issuing from the rupture of the emulsion. They can be collected with the use of an oleophile drum or simply evacuated with the use of an overflow, or other means forming part of the state of the art and which, for that reasion, have not been represented.

The process consisting in provoking the passage of an emulsion through a percolating electrode under electric voltage to break this emulsion and allow thereafter the separation of the constituents, applies to all kinds of emulsions. By way of example, the results of its application to an emulsion of hydrocarbons in water are given.

EXAMPLE OF OPERATING THE NOVEL PROCESS

It was verified closely with the percolating electrodes in metal wire as well as in carbon felt, that without applying the voltage to the electrode, the emulsion passes through it without being broken. The application of the voltage to the electrode is indispensable to cause to coalesce the micelles and rupture the emulsion.

The emulsion, object of the experiment, contained 550 ppm gazoline, 5 g NaCl per liter, 250 ppm corrosion inhibitor and 50 mg/liter bactericide.

The cell had a volume of 2 liters. It was provided with a cathode in woven felt of 80 cm$^2$ surface and the flow-rate of the emulsion was 2.5 liters per hour.

The electric parameters were E=1.8 to 2 volts, I=0-.4A on average.

The current density on the cathode was thus 50A/m$^2$.

R designates the recovery yield, representing the hydrocarbon depart of the aqueous phase:

$$R \left( \frac{\text{HC content at the input} - \text{HC yield at the output}}{\text{HC content at the input}} \right) \times 100$$

(HC = hydrocarbon)

| ddp | Recovery yield = R % | |
|---|---|---|
| | Felt cathode | Expanded titanium cathode |
| 2 V | 82% | 63% |
| 1,8 V | 78% | 66% |

The tests were realized under identical conditions with water containing 30 g/l NaCl.

| ddp | Recovery yield = R % | |
|---|---|---|
| | Felt cathode | Expanded titanium cathode |
| 2 V | 88% | 68% |
| 1.8 V | 87% | 89% |

Emulsions having a lower hydrocarbon content (100 ppm) in aqueous solution at 5 g/l NaCl were also tested.

In this case, it appears that the yields are close to 60% with the two types of electrodes.

We claim:

1. Process to break stabilized emulsions, comprising feeding an emulsion into a space defined in part by one face of a surfactant treated permeable membrane constituting a precolating electrode, applying an electric current to the membrane, and removing effluent flowing through the membrane from a space defined in part by another face of the permeable membrane.

2. Process according to claim 1 further comprising creating a pressure difference between the two spaces separated by the permeable membrane in order to control the emulsion flow-rate through the membrane.

3. The method of claim 1, wherein the permeable membrane percolating electrode contains metallic fibres.

4. The method of claim 3, wherein the metallic fibres are expanded titanium.

5. The method of claim 1, wherein the percolating electrode contains carbon or graphite fibres.

6. The method of claim 1, wherein the surfactant with which the permeable membrane percolating electrode is treated has an HLB number between 5 and 20.

7. The method of claim 6, wherein the HLB number is between 10 and 16.

8. The method of claim 7, wherein the surfactant is alkylsufate-based.

9. The method of claim 1 wherein the percolating electrode is a cathode.

10. Emulsion breaking apparatus comprising a tank divided into two compartments by a permeable membrane constituting a percolating electrode, a first compartment comprising means for receiving the emulsion, and a second compartment in which is disposed a counter electrode, means for connecting the membrane to a direct current electric supply, means for separating the phases of the emulsion from the second compartment, and wherein the permeable membrane percolating electrode comprises s membrane impregnated with a surfactant.

11. Apparatus according to claim 10, wherein the permeable membrane percolating electrode is comprised of metallic fibres.

12. Apparatus according to claim 11, wherein the metallic fibres comprise expanded titanium.

13. Apparatus according to claim 10, wherein the percolating electrode comprises carbon or graphite fibres.

14. Apparatus according to claim 10, wherein the surfactant has an HLB number between 5 and 20.

15. Apparatus according to claim 14 wherein the HLB number is between 10 and 16.

16. Apparatus according to claim 15, wherein the surfactant is alkylsulfate-based and known in the trade as TEEPOL.

17. Apparatus according to claim 13, in which the percolating electrode is a cathode.

* * * * *